(12) United States Patent
Takhim

(10) Patent No.: US 7,824,634 B2
(45) Date of Patent: Nov. 2, 2010

(54) METHOD FOR ETCHING PHOSPHATE ORES

(75) Inventor: Mohamed Takhim, Louvain-la-Neuve (BE)

(73) Assignee: Ecophos, Louvain-la-Neuve (BE)

( * ) Notice: Subject to any disclaimer, the term of this patent is extended or adjusted under 35 U.S.C. 154(b) by 377 days.

(21) Appl. No.: 10/583,344

(22) PCT Filed: Dec. 23, 2004

(86) PCT No.: PCT/EP2004/053697

§ 371 (c)(1),
(2), (4) Date: Aug. 4, 2006

(87) PCT Pub. No.: WO2005/066070

PCT Pub. Date: Jul. 21, 2005

(65) Prior Publication Data

US 2007/0122326 A1    May 31, 2007

(30) Foreign Application Priority Data

Dec. 24, 2003    (BE) .................. 2003/0683

(51) Int. Cl.
*C01B 25/22* (2006.01)
*C01B 25/32* (2006.01)
*C22B 26/20* (2006.01)

(52) U.S. Cl. ............... 423/157.2; 423/321.2; 423/157.3

(58) Field of Classification Search .............. 423/157
See application file for complete search history.

(56) References Cited

U.S. PATENT DOCUMENTS

| | | | |
|---|---|---|---|
| 3,304,157 A | | 2/1967 | Baniel et al. |
| 3,919,395 A | | 11/1975 | Hauge |
| 3,937,783 A | * | 2/1976 | Wamser et al. .................. 423/8 |
| 3,949,047 A | * | 4/1976 | Cherdron et al. ............... 423/2 |
| 3,988,420 A | * | 10/1976 | Loewy et al. ................ 423/157 |
| 4,012,491 A | * | 3/1977 | Hauge ......................... 423/309 |
| 4,113,588 A | * | 9/1978 | Watanabe et al. ........... 423/481 |
| 6,183,712 B1 | * | 2/2001 | De Waal ..................... 423/308 |
| 7,361,323 B2 | * | 4/2008 | Takhim ................... 423/321.2 |
| 2005/0238558 A1 | * | 10/2005 | Takhim ....................... 423/319 |
| 2007/0166217 A1 | * | 7/2007 | Takhim ....................... 423/305 |

FOREIGN PATENT DOCUMENTS

| | | |
|---|---|---|
| ES | 2013211 | 4/1990 |
| GB | 1051521 | 12/1966 |
| GB | 1504018 | 3/1978 |

* cited by examiner

*Primary Examiner*—Melvin C Mayes
*Assistant Examiner*—Yun Qian
(74) *Attorney, Agent, or Firm*—Dykema Gossett PLLC

(57) ABSTRACT

A method for etching phosphate ores includes a single-pass digesting of ores which $P_2O_5$ content is greater than 20% in weight by a hydrochloric aqueous acid solution having an HCl concentration less than 10% by weight with an etching solution formation and the separation of the insoluble solid phase and the aqueous phase of the etching solution. Preneutralization of the etching solution is accomplished by a neutralizing agent prior to the separation in such a way that the etching solution pH which is less than pH to which an important part of phosphate ions in solution precipitates in the form of calcium monohydrogen phosphate (DCP) is adjusted and in subsequently neutralizing the separated aqueous phase in such a way that a pure DCP is precipitated.

13 Claims, 2 Drawing Sheets

METHOD FOR ETCHING PHOSPHATE ORES

BACKGROUND OF THE INVENTION

1. Field of the Invention

The present invention relates to a method for etching phosphate ore, comprising:

- a digestion of phosphate ore by an aqueous solution of hydrochloric acid, which results in formation of an etching liquor consisting of an aqueous phase, in which calcium phosphate is in solution, and an insoluble solid phase which contains impurities,
- a first separation between the insoluble solid phase and the aqueous phase of the etching liquor,
- a preliminary neutralization of an aqueous medium containing calcium phosphate in solution to a first pH which is lower than the pH at which a significant part of this calcium phosphate in solution precipitates in the form of calcium monohydrogen phosphate (DCP), with precipitation of impurities,
- an isolation of the precipitated impurities from the pre-neutralized aqueous medium,
- a subsequent neutralization of said pre-neutralized aqueous medium to a second pH which is greater than the aforementioned first pH, with precipitation of DCP, and
- a second separation between the subsequently neutralized aqueous medium, which is an aqueous solution of calcium chloride, and the precipitated DCP.

2. The Prior Art

For a long time, methods have been known which provide for hydrochloric etching of phosphate ore (see patents U.S. Pat. No. 3304157, GB-1051521, ES-2013211 and SU-A-1470663 for example).

These methods have the drawback that they generally use, for etching purposes, a concentrated HCl solution of up to 20% and even 30% by weight. The ore to be used has to be of good quality, that is to say must have a high P2O5 content, and fine grinding of the ore is usually required, which increases the costs. During etching, a thermal shock is obtained which is due not only to the exothermic nature of the reaction but also to the dissolution energy which is released, and the insoluble materials are therefore difficult to separate since the liquor obtained is viscous and is loaded with organic materials originating from the ore. Given the high temperature and the concentration of the HCl solution, significant corrosion problems arise.

Also known is a hydrochloric etching method in which the ore is subjected to a first (limited) etching by dilute hydrochloric acid (see U.S. Pat. No. 3,988,420). The aim of this method is solely to dissolve within the rock, by means of this dilute acid, a substantial part of the calcium carbonate but the smallest possible amount of phosphate, which gives a solid phase enriched in P2O5 for the rest of the treatment.

Also known is a hydrochloric etching method as indicated in the introduction (see FR-A-2115244). This method consists in treating ores which contain very little phosphate, in a counter-current process, with several successive concentrations of hydrochloric acid. This process requires complex and expensive equipment to eliminate enormous quantities of sand and other insoluble materials which pollute this ore. This results in a loss of P2O5 during the treatment of the insoluble materials, and this loss has to be recuperated as much as possible by washing steps.

When a phosphate ore is digested in dilute HCl, two results determine the feasibility of the etching operation:

- the yield of P2O5 in solution in the liquid phase. Any P2O5 which remains in the solid residue represents a loss and reduces the yield. This yield is expressed in % of P2O5 present in the treated ore.
- the level of purity of the end product, which increases as the amount of impurities dissolved in the liquid etching phase decreases. Within the meaning of the invention, the impurities are all the components (anions, cations and heavy metals, etc.) which are not water, P2O5 and calcium and chlorine ions. In the rest of the description, two elements will be selected as standards representative of the level of purity of the end product, namely fluorine and iron. In the text which follows, the end product will be calcium monohydrogen phosphate (DCP) in which the planned maximum content will be 0.2% for F and 0.05% for Fe.

It should be noted that the greater the yield of P2O5 in solution, the lower the degree of purity; this is because when all the P2O5 is dissolved, generally most of the impurities are also dissolved. A compromise must therefore be made between the desired level of purity for the end product and the minimum permitted yield of P2O5 in solution for the method to remain profitable, which is primarily determined by the cost of the raw material.

When the starting ore is of suitable quality, it has already been known to apply a method comprising a digestion of the phosphate ore by an aqueous solution of HCl having a concentration of at most 10% by weight, a separation between the insoluble materials and an aqueous phase containing phosphate ions, chloride ions and calcium ions, and a neutralization of the aqueous phase in order to precipitate DCP (see international patent application no. PCT/BE03/00111, not yet available to the public on the priority date of the present patent application).

This is because if conditions are stipulated whereby the minimum yield of P2O5 dissolved by dilute HCl is to be 75% and the minimum level of purity of the end product is 40%, it is possible to determine, as a function of one variable of the method, the conditions under which the method can be carried out. Such an example is shown on the graph in FIG. 1, for a given phosphate ore. The percentages shown on the ordinate represent the level of purity of the end product (curve shown in solid line) and the yield of P2O5 in solution (curve shown in dashed line), and the graduation on the abscissa is that of a given variable of the method. In the shaded zone, between the two limit points A and B, are the conditions suitable for obtaining the minimum values mentioned above, in accordance with the teaching of the application PCT/BE03/00111.

FIG. 2 shows a similar graph, but for a different phosphate ore. It can be seen that, for this ore, it is not possible to achieve conditions under which both the minimum yield of P2O5 (point A) and the minimum level of purity (point B) can be met.

The object of the present invention is therefore to develop a hydrochloric etching method in which the ratio between the yield of P2O5 in solution and the level of purity of the end product is optimized so as to allow economically profitable etching of the ore, while carrying out this process using modern and simple equipment of justifiable expense.

SUMMARY OF THE INVENTION

According to the invention, this problem has been solved by a method as described in the introduction which comprises a digestion, in one step and in co-current, of phosphate ore having a P2O5 content of more than 20% by weight by an aqueous solution of hydrochloric acid having an HCl concentration of less than 10% by weight, and in which, in order to reach said first pH, said preliminary neutralization is carried out before said first separation in said etching liquor as aqueous medium containing calcium phosphate in solution, the isolation of the precipitated impurities taking place during said first separation of said insoluble solid phase, and said aqueous medium which has been pre-neutralized and subjected to said subsequent neutralization being formed of the separated aqueous phase resulting from the first separation.

Since the hydrochloric etching takes place in a dilute medium, which is therefore not viscous, the separation of the insoluble materials is easier and quicker to carry out, no heat is released during the etching operation, which advantageously takes place at ambient temperature, and the problems of corrosion by the hydrochloric acid are largely avoided.

A simple reactor which is equipped with a stirrer and operates at ambient pressure and temperature may therefore be sufficient for the treatment of the phosphate ore, and this therefore represents equipment of particularly favourable cost.

The effect of the preliminary neutralization is to promote a preliminary precipitation of heavy metals, in particular Fe and Mg, and of other impurities such as fluorine, so as to result in a permissible yield of P2O5 in solution during the etching process. The DCP thus obtained is particularly pure, more than could be expected by etching using dilute hydrochloric acid.

A significant part of the phosphate ions should be understood to mean that more than 10% of the dissolved P2O5 precipitates.

The aforementioned preliminary neutralization may take place for example in a separate vessel which is arranged immediately downstream of that used for digestion. Advantageously, the pH should be adjusted to a value of between 0.8 and 4, preferably between 1.3 and 1.5, so as to avoid as far as possible any premature precipitation of DCP. The precipitated heavy metals are thus advantageously separated in a single separation step with the insoluble components resulting from the etching.

The neutralizing agent according to the invention for the preliminary neutralization is preferably a strong base selected from the group consisting of the hydroxide, the oxide and the water-soluble salts of calcium, sodium, potassium and/or ammonium.

The digestion in particular and the entire hydrochloric etching process can preferably be carried out at ambient temperature. Temperatures of 20 to 80° C. can also be used.

Finally, the concentration of the aqueous HCl solution used for the etching is advantageously 3 to 8%, preferably 5 to 7.4%.

The dilute hydrochloric acid used in the method according to the invention may originate from any source. It is possible for example to obtain such dilute aqueous solutions of HCl on the market or as an effluent from another process. It is also possible to dilute concentrated hydrochloric acid, as commonly available on the market, in an aqueous phase. It is also possible to treat an aqueous solution of calcium chloride with sulphuric acid so as to precipitate calcium sulphate and isolate an aqueous HCl solution. Such an aqueous solution of calcium chloride can be obtained for example as an effluent from other processes, for example from certain processes for producing sodium carbonate.

In the method according to the invention, the insoluble phosphate resulting from the subsequent neutralization is calcium monohydrogen phosphate (DCP) having a very high level of purity and at the same time being rich in P2O5. Its P2O5 content may for example be 40 to 50% by weight, regardless of the ore used which at the start has a P2O5 content of more than 20% by weight. The phosphate ore may advantageously have a P2O5 content of 25 to 35% by weight.

During the subsequent neutralization, the pH is advantageously adjusted to a value of at least 4.5, preferably at least 5. At this pH, all of the phosphate ions in solution in the aqueous phase, in the form of calcium dihydrogen phosphate (MCP), pass to the insoluble DCP state. This neutralization is preferably carried out using a strong base selected from the group consisting of the hydroxide, the oxide and the water-soluble salts of calcium, sodium, potassium and/or ammonium.

According to one particular embodiment of the invention, the method comprises a treatment of said aqueous solution of calcium chloride with an aqueous solution of sulphuric acid, with formation of insoluble calcium sulphate, which precipitates, and of an aqueous phase based on hydrochloric acid, an isolation of the calcium sulphate precipitate, and an at least partial recycling, to the digestion step, of the aqueous phase based on hydrochloric acid, so as to form said aqueous solution of hydrochloric acid.

According to an improved embodiment of the invention, the method also comprises an additional neutralization of said aqueous solution of calcium chloride, by an addition of a neutralizing agent, so as to adjust this aqueous solution to a pH which is greater than the pH of the subsequent neutralization and so as to precipitate residual impurities, and an elimination of these impurities from said aqueous solution, a treatment of the latter with an aqueous solution of sulphuric acid, with formation of insoluble calcium sulphate, which precipitates, and of an aqueous phase based on hydrochloric acid, an isolation of the calcium sulphate precipitate, and a recycling, to the digestion step, of the aqueous phase based on hydrochloric acid, so as to form said aqueous solution of hydrochloric acid. By virtue of this step of the method, it is possible to precipitate all the undesired impurities, for example amphoteric metals, and to create a closed recycled system, without any gradual increase in the content of these impurities in the cycle.

Other information concerning the etching method according to the invention is given in the appended claims.

Other details and features of the method will also emerge from the following description of non-limiting examples, with reference to the appended drawings.

DETAILED DESCRIPTION OF THE PREFERRED EMBODIMENTS

Figure 1:
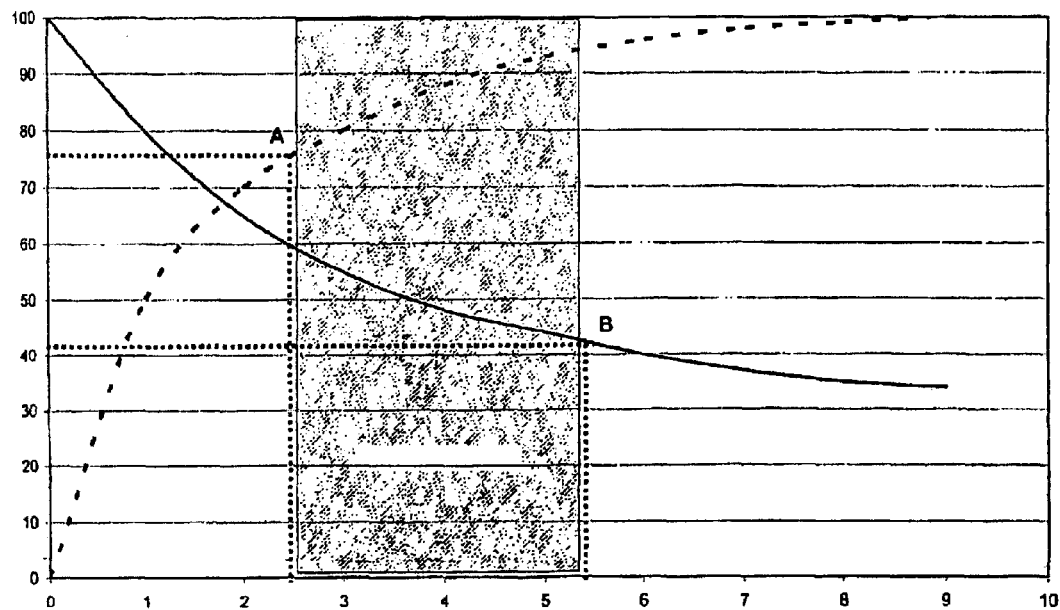
FIGS. 1 and 2 show graphs which have already been described above.
Figure 2:
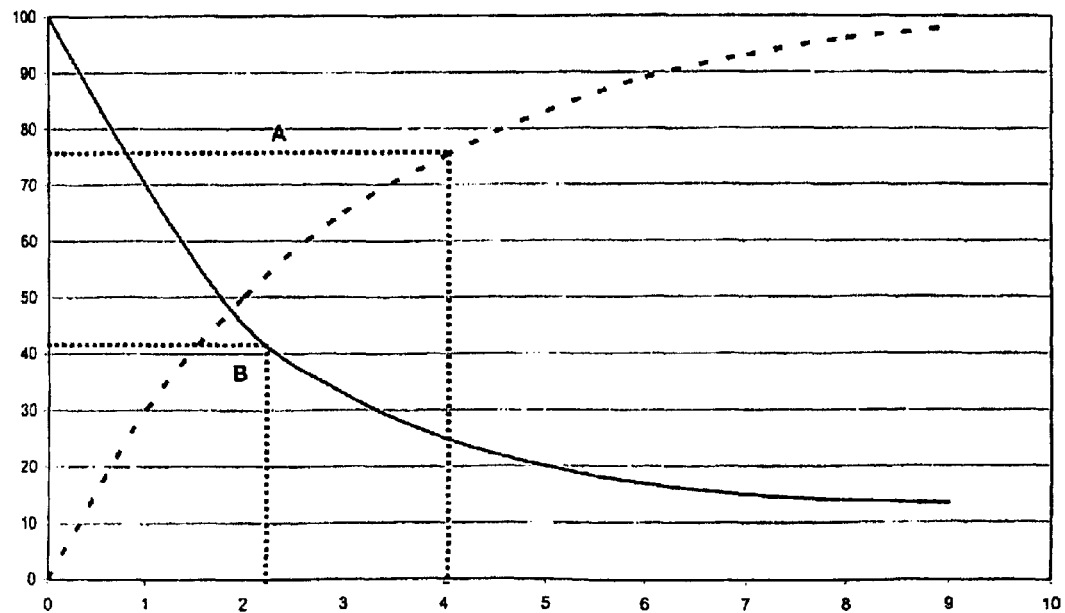
Figure 3:
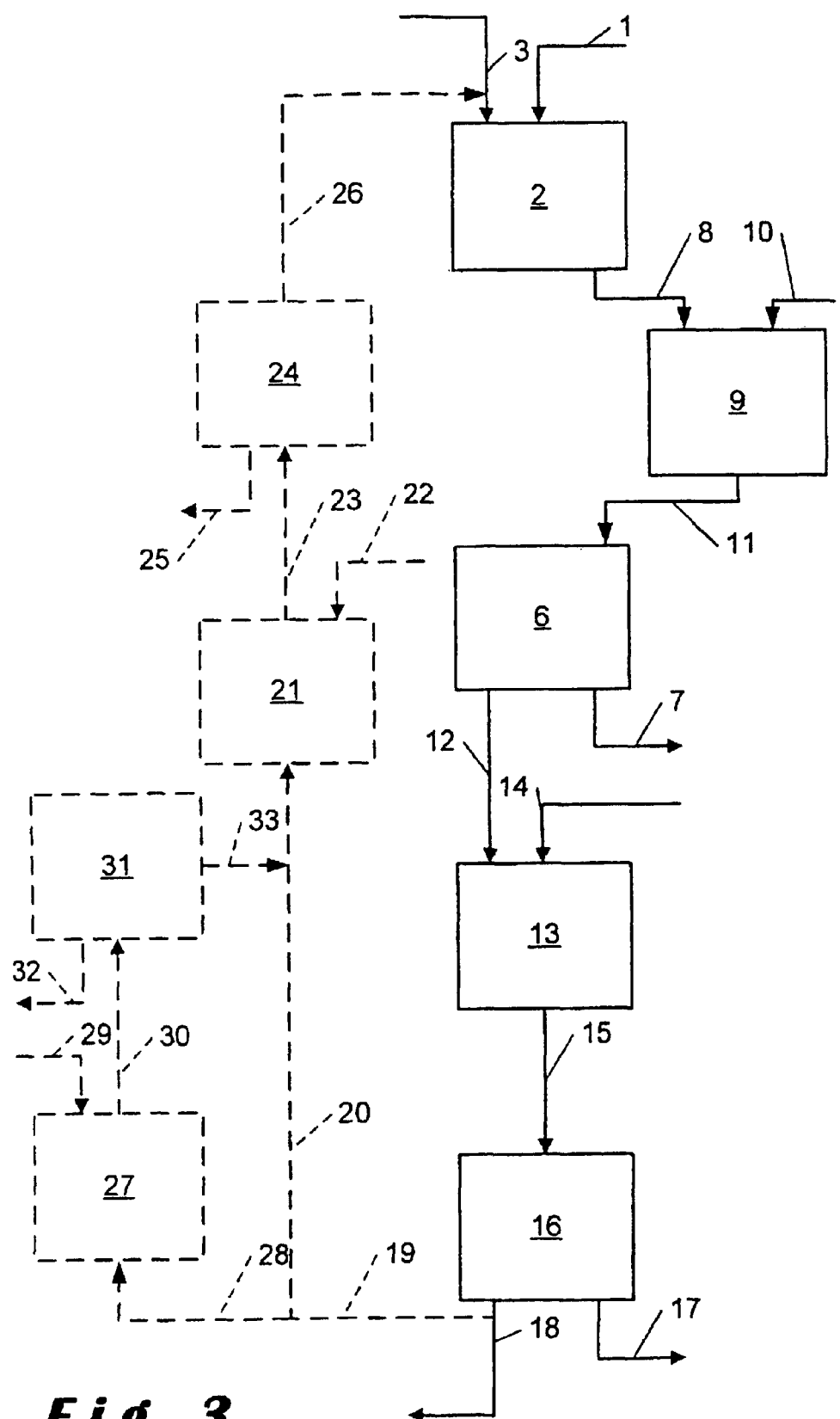
FIG. 3 shows, in the form of a flowchart, one example of embodiment of a module for producing DCP, in which a method for etching phosphate ore according to the invention is carried out.

As shown in FIG. 3, an extracted phosphate ore with a P2O5 content of 28 to 32% by weight is fed at 1 into a digestion vessel 2, where it is subjected, in a single step, to etching in co-current by a solution of hydrochloric acid of around 5% by weight, which is added to this vessel via a conduit 3. A phosphate ore as extracted is to be understood to mean that it has not been subjected to any calcination or to any fine grinding, in particular in mines where the extracted ore is in powdered form. If the ore is of volcanic origin, simple crushing may be provided to achieve a grain size of around 150 to 500 μm.

In the digestion vessel 2, the dissolution of calcium phosphate is carried out at ambient temperature and it is rapid and intense, in the form of H3PO4 and soluble MCP.

It is then possible to introduce a neutralizing agent, such as hydrated lime for example, into a preliminary neutralization vessel 9 which is arranged downstream of the digestion vessel 2 and to which the latter is connected via the conduit 8. This introduction of neutralizing agent is carried out via a conduit 10, and it has the effect of maintaining in the vessel 9 a pH which will be for example between 1.3 and 1.5. At this high pH, the heavy metals, such as Fe, and other impurities, such as F, which have been dissolved from the ore by hydrochloric etching, are precipitated, and a suspension of solid particles is obtained. The cloudy liquid thus obtained is sent via the conduit 11 to a separation device 6, for example a filter press, in which the solids, that is to say the insoluble materials resulting from the hydrochloric etching and the substances that have precipitated in the vessel 9, are separated out together at 7, following the advantageous addition of a suitable filtration adjuvant, known per se, and removed.

The liquid phase resulting from the separation contains, in dissolved form, phosphoric acid, monobasic calcium phosphate MCP, calcium chloride and some residual impurities.

The separated aqueous phase containing phosphate, calcium and chloride ions which leaves the separation device 6 via the conduit 12 is then transferred into a subsequent neutralization vessel 13, in which dibasic calcium phosphate DCP is precipitated by introducing into the liquid phase, at 14, a neutralizing agent of the same type as described above, for example calcium carbonate or milk of lime. Here, the pH will advantageously reach a value of around 5, at which all the MCP is converted to water-insoluble DCP.

In order to separate the precipitate, it is possible for example to evacuate the neutralized medium at 15 and to pass it in particular through a belt filter 16, where the solid material is separated, that is to say a moist cake of DCP 17, containing approximately 40-50% by weight of P2O5, determined on the dry product, 25-28% of Ca and minimal traces of impurities. The filtrate is removed at 18. It consists of an aqueous solution of CaCl2, which can easily be eliminated since it does not cause much pollution and can even easily be reused. Calcium chloride can be used for example as an antifreeze product on pavements.

During this hydrochloric etching, a yield of P2O5 in solution of more than 75%, preferably more than 90% and very advantageously more than 95% by weight can be obtained. Even with such a high etching yield, levels of purity which are greater than the required minimum values are achieved in the DCP obtained at 17, for example a maximum content of F of 0.2% and of Fe of 0.05%.

Instead of removing the aqueous solution of CaCl2 which leaves the belt filter 16, it is also possible to direct it via conduits 19 and 20 to a reactor 21 which is fed with an aqueous solution of sulphuric acid via the conduit 22. In this reactor, which is stirred at a temperature of around 60° C. for one hour, formation of insoluble calcium sulphate is obtained, which precipitates in a highly pure form. Through the conduit 23, the liquor resulting from the sulphuric etching is subjected to a separation step, for example by filtration at 24. The solid phase formed of calcium sulphate is removed at 25, and the liquid phase formed of an aqueous solution of highly pure HCl is sent back, via the conduit 26, to the conduit 3 for supplying dilute hydrochloric acid.

Since sulphuric acid is more common and more readily available in large quantities than hydrochloric acid, this recycling makes it possible to further improve the hydrochloric etching yield, and even to provide said etching at locations where HCl is difficult to obtain.

Alternatively, before the sulphuric etching reactor, it is possible to pass the aqueous solution of CaCl2 leaving the belt filter 16 to an additional neutralization vessel 27, passing via the conduit 28.

In this vessel 27, a neutralizing agent is once again introduced at 29, preferably hydrated lime or calcium carbonate, so as to reach a pH of around 9-10, which has the effect of precipitating all the residual impurities such as amphoteric metals, etc. The suspension obtained is transferred via the conduit 30 to a separator 31. The separated cake is removed at 32, and the highly pure filtrate formed of CaCl2 in aqueous solution is led via the conduits 33 and 20 to the sulphuric etching reactor 21.

It is of course also possible to envisage feeding the dilute hydrochloric acid source with an aqueous solution of CaCl2 resulting from another method, by optionally treating this aqueous solution beforehand by means of a sulphuric etching step, as in the reactor 21, optionally after a neutralization as in the neutralization device 27.

The invention will now be described in more detail on the basis of an example of embodiment, which is given by way of non-limiting example.

EXAMPLE a. Use is made of phosphate ore of Syrian origin which has a P2O5 content of 30% by weight.

The etching of the ore is carried out in a batchwise manner using an aqueous solution having an HCl content of 7.4% by weight, at a temperature of 25° C. In this example, the digestion is carried out in co-current in a reactor equipped with a stirrer, and it takes around 30 minutes per batch.

The amount of HCl added is determined by a molar ratio between the HCl added to the ore and the Ca present in the latter (an HCl/Ca ratio=1 being defined as an addition of HCl such that all the Ca of the ore is dissolved in the form of CaCl2 in the aqueous phase). In this example, the etching of the ore is carried out at several HCl/Ca ratios varying from 0.6 to 0.9.

Following digestion, the suspension is filtered and the filtrate is subjected to a neutralization by hydrated lime so as to obtain a precipitated DCP cake.

Analysis of the yield of P2O5 in solution and of the contents of F and Fe++ in the DCP is then carried out, which gives the following results:

| Ratio HCl/Ca | Yield of P2O5 in solution % by weight | Fraction of ore in the form of residue % by weight | Fluorine in DCP % by weight | Iron in DCP % by weight |
|---|---|---|---|---|
| 0.6 | 80 | 55 | 0.41 | 0.06 |
| 0.7 | 92 | 52 | 0.48 | 0.064 |
| 0.8 | 95 | 48 | 0.65 | 0.096 |
| 0.9 | 96 | 47 | 0.78 | 0.12 |

As can be seen, although the yield of P2O5 in solution is entirely acceptable, the contents of Fe and F in the final DCP are too high (F>0.2% by weight and Fe>0.05% by weight).

b. Etching is carried out on the same ore. The etching of the ore takes place in a batchwise manner using an aqueous solution having an HCl content of 7.4% by weight, at a temperature of 25° C. In this example, the digestion takes around 30 minutes per batch and the molar ratio HCl/Ca is set at 0.9.

Before the first liquid/solid separation, the pH is controlled using hydrated lime so as to set different values, then filtration is carried out, followed by another neutralization to precipitate the DCP, which is separated in the form of a cake.

Analysis gives the following results:

| pH | Yield of P2O5 in solution % by weight | Fluorine in DCP % by weight | Fe in DCP % by weight |
|---|---|---|---|
| 0.6 | 95 | 0.79 | 0.12 |
| 1.3 | 78 | 0.25 | 0.05 |
| 1.5 | 77 | 0.074 | 0.04 |
| 1.7 | 67 | 0.047 | 0.036 |
| 1.9 | 54 | 0.055 | 0.036 |

As can be seen, by adjusting the pH to the range of 1.3 to 1.5 before filtration of the first liquid/solid separation, it is made perfectly possible to use an ore which, without pre-neutralization, could not be used, simply by etching with dilute hydrochloric acid. The yields of P$_2$O$_5$ in solution are still acceptable, and the level of purity obtained in the end product is excellent. A single step of separating impurities is required for this.

It should be understood that the present invention is in no way limited to this example of embodiment, and that many modifications can be made thereto without departing from the scope of the appended claims.

The invention claimed is:

1. A method for etching phosphate ore, consisting of the sequential steps of:
   (a) a digestion, in one step and in co-current, of phosphate ore having a P$_2$O$_5$ content of more than 20% by weight and an aqueous solution of hydrochloric acid having an HCl concentration of less than 10% by weight, which results in formation of an etching liquor consisting of an aqueous phase, in which calcium phosphate is in solution, and an insoluble solid phase which contains impurities,
   (b) a preliminary neutralization of the etching liquor containing calcium phosphate in solution to a first pH which is between about 0.8 and 4.0, with precipitation of impurities,
   (c) a first separation between the insoluble solid phase and the aqueous phase of the neutralized etching liquor, during which an isolation of the precipitated impurities takes place,
   (d) a subsequent neutralization of the separated aqueous phase resulting from the first separation to a second pH which is greater than said first pH, with precipitation of calcium monohydrogen phosphate, and
   (e) a second separation in this subsequently neutralized aqueous phase between an aqueous solution of calcium chloride and the precipitated DCP.

2. The method according to claim 1, comprising adjusting said second pH of said separated aqueous phase resulting from the first separation by said subsequent neutralization to a value of at least 4.5.

3. The method according to claim 1, wherein said preliminary and subsequent neutralizations are carried out using a strong base selected from at least one of the group consisting of the hydroxide, the oxide and the water-soluble salts of calcium, sodium, potassium and ammonium.

4. The method according to claim 1, wherein the digestion is carried out at a temperature between about 20 and 80° C.

5. The method according to claim 1, further comprising a preliminary step of forming said aqueous solution of hydrochloric acid by diluting concentrated hydrochloric acid in water.

6. The method according to claim 1, further comprising a preliminary step of forming said aqueous solution of hydrochloric acid by treating an aqueous solution of calcium chloride with sulphuric acid and removing a calcium sulphate precipitate therefrom.

7. The method according to claim 1, wherein the phosphate ore has a P$_2$O$_5$ content of 25 to 35% by weight.

8. The method according to claim 1, wherein said aqueous solution of hydrochloric acid which is used in the digestion has an HCl concentration of around 3 to 8% by weight.

9. The method according to claim 1, further comprising a treatment of said aqueous solution of calcium chloride with an aqueous solution of sulphuric acid, with formation of insoluble calcium sulphate, which precipitates, and of an aqueous phase based on hydrochloric acid, an isolation of the calcium sulphate precipitate, and an at least partial recycling, to the digestion step, of the aqueous phase based on hydrochloric acid, so as to form said aqueous solution of hydrochloric acid.

10. The method according to claim 1, further comprising an additional neutralization of said aqueous solution of calcium chloride, so as to adjust this aqueous solution to a pH which is greater than the pH of the subsequent neutralization and so as to precipitate residual impurities, and an elimination of these impurities from said aqueous solution, a treatment of the latter with an aqueous solution of sulphuric acid, with formation of insoluble calcium sulphate, which precipitates, and of an aqueous phase based on hydrochloric acid, an isolation of the calcium sulphate precipitate, and a recycling, to the digestion step, of the aqueous phase based on hydrochloric acid, so as to form said aqueous solution of hydrochloric acid.

11. The method according to claim 10, wherein the pH of said aqueous solution of calcium chloride is adjusted by said additional neutralization to a value of at least 8.5.

12. The method according to claim 10, wherein the additional neutralization is carried out using a strong base selected from at least one of the group consisting of the hydroxide, the oxide and the water-soluble salts of calcium, sodium, potassium and ammonium.

13. The method according to claim 1, wherein the digestion takes place in a reactor equipped with a stirrer.

* * * * *